Jan. 22, 1963   T. R. THOMAS   3,074,510
LUBRICATION
Filed May 27, 1958   4 Sheets-Sheet 1
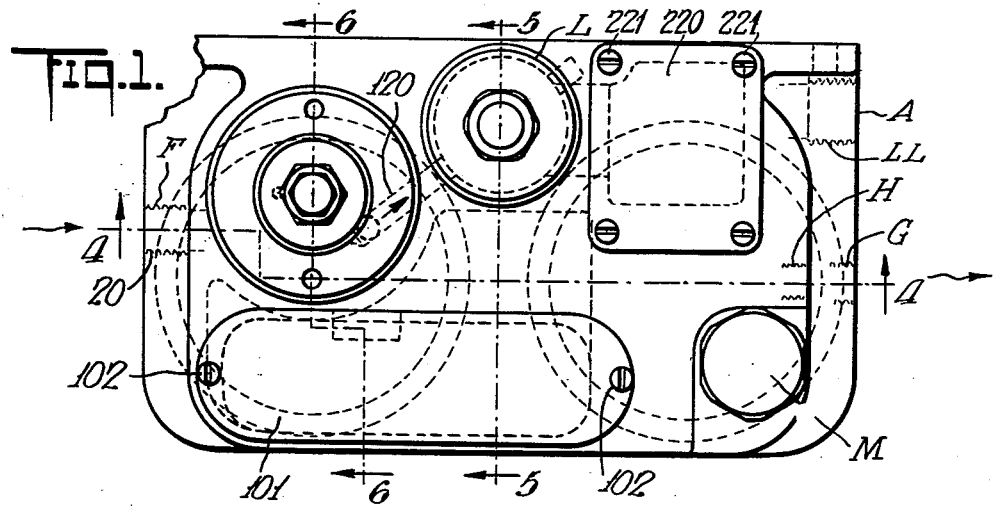
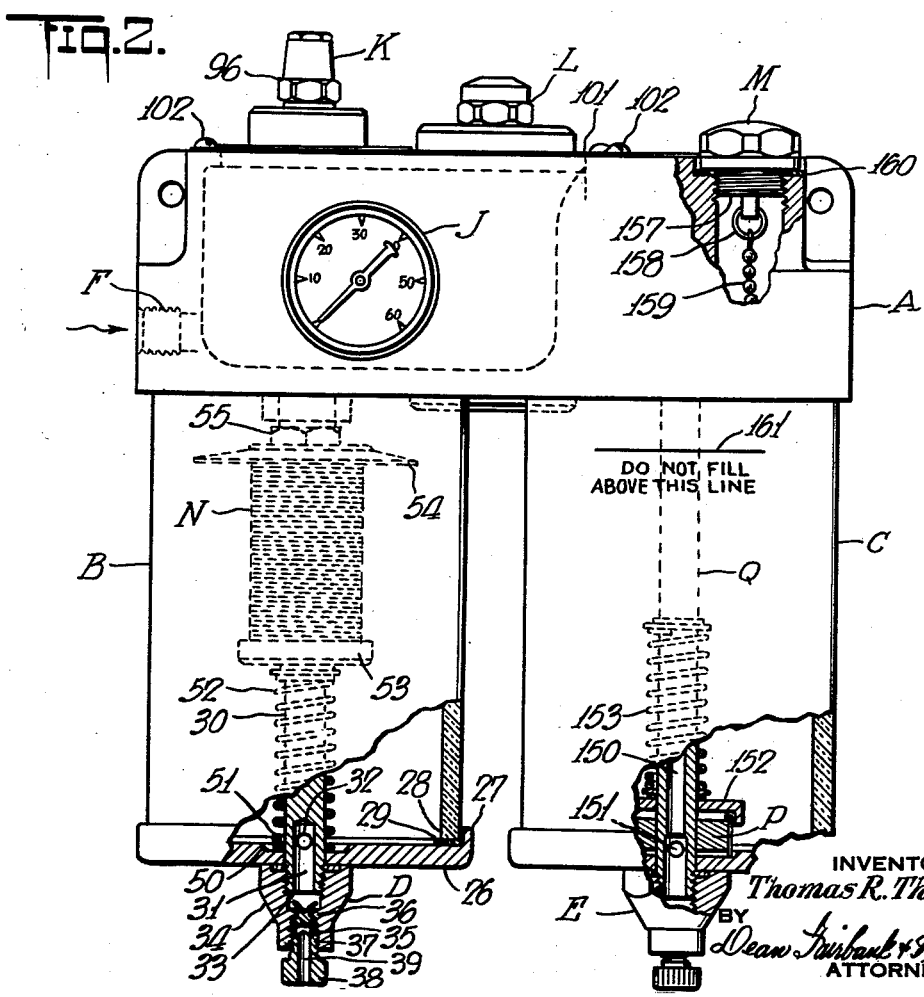
INVENTOR
Thomas R. Thomas
BY
Dean Fairbank & Hirsch
ATTORNEYS

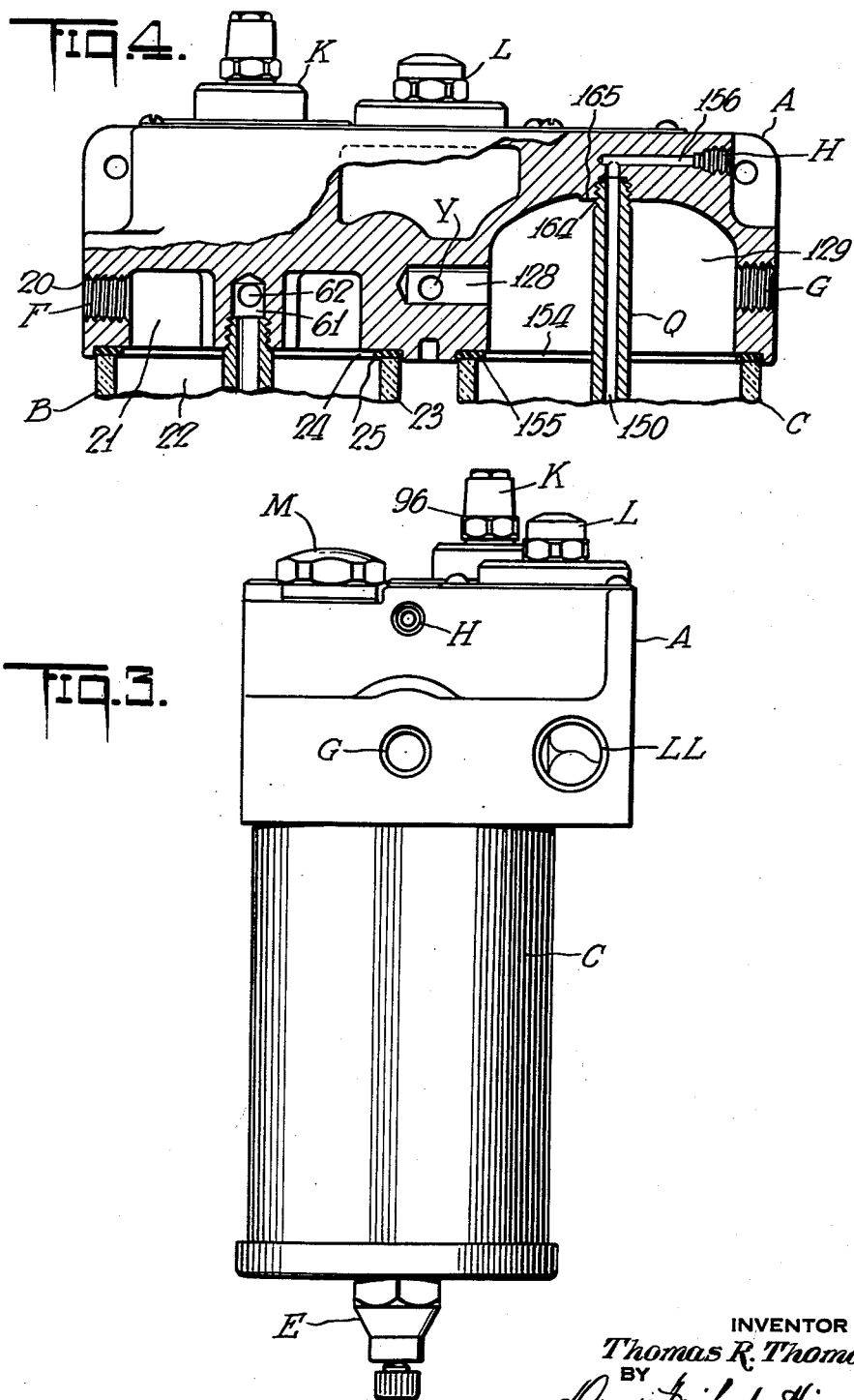

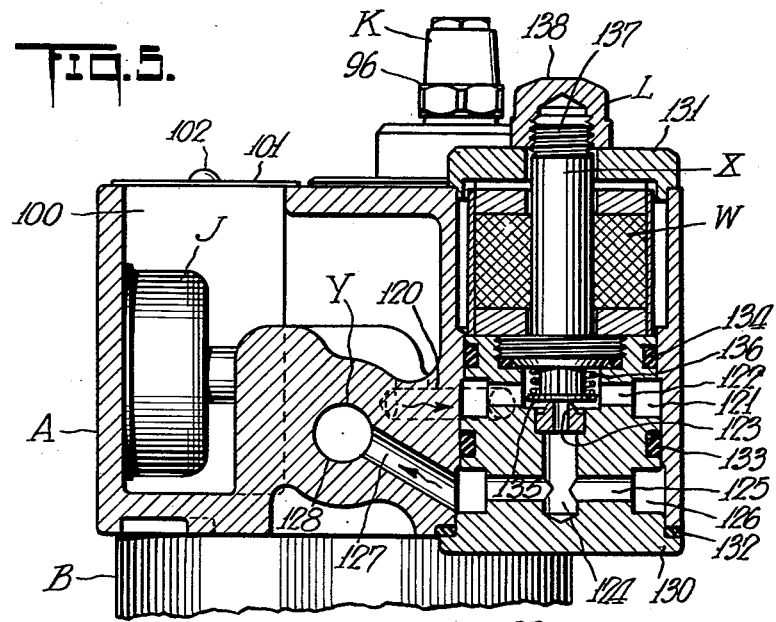
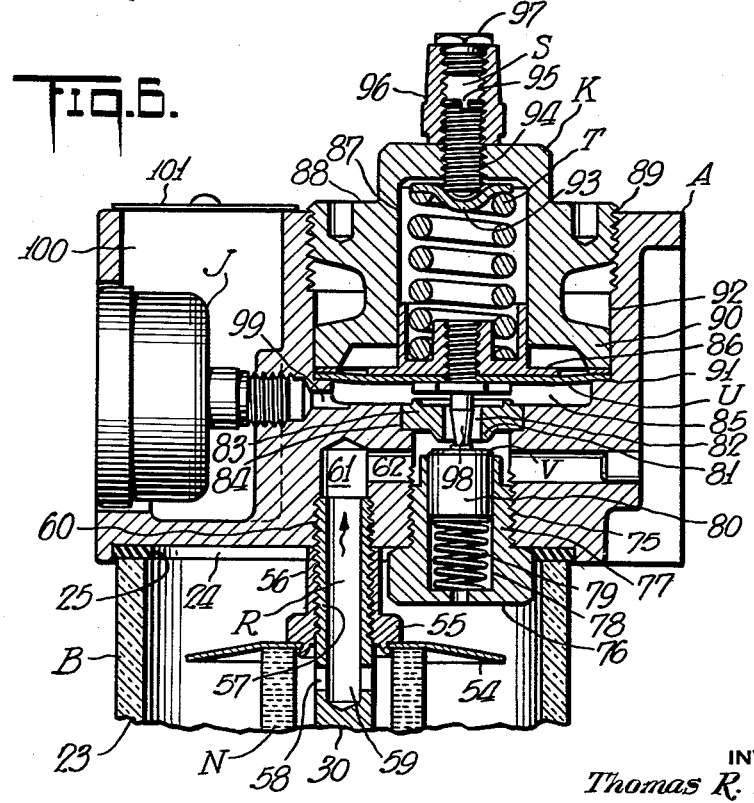

Jan. 22, 1963     T. R. THOMAS     3,074,510
LUBRICATION
Filed May 27, 1958     4 Sheets-Sheet 4
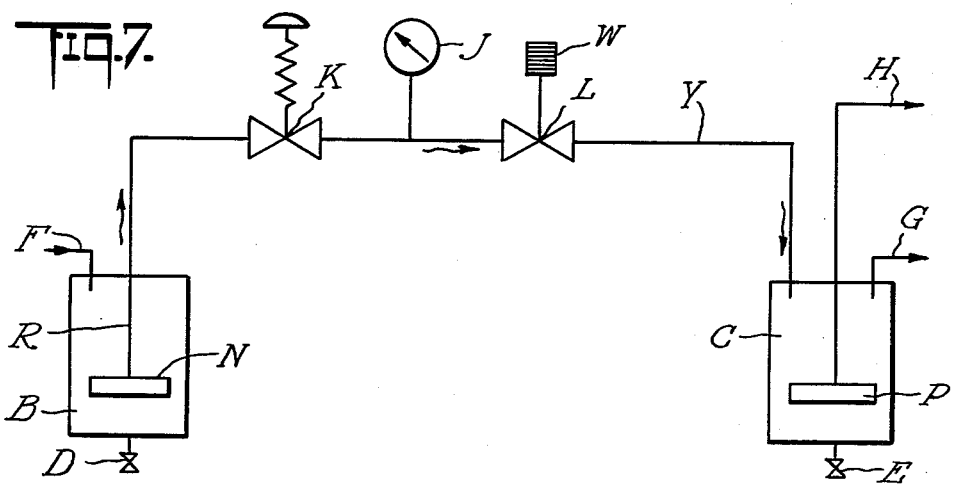
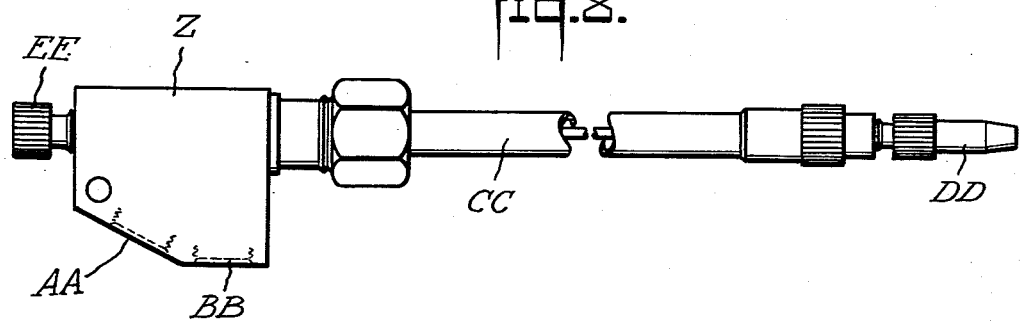
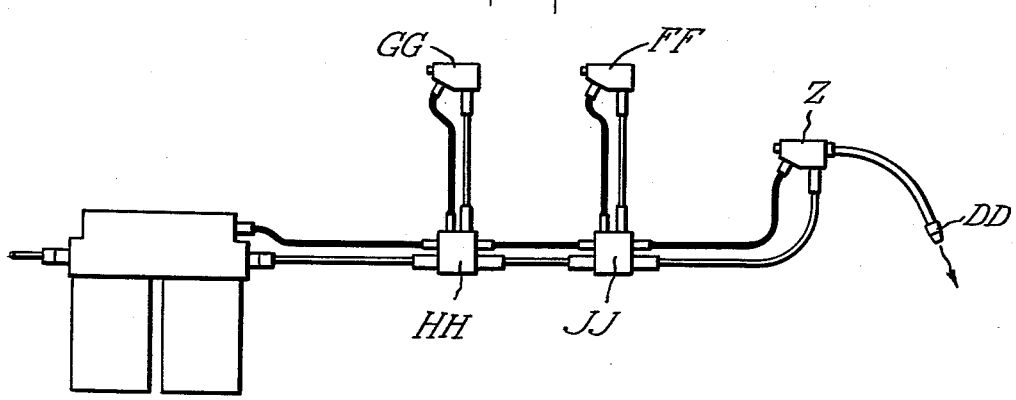
INVENTOR
*Thomas R. Thomas*
BY
*Dean Fairbank & Hirsch*
ATTORNEYS

United States Patent Office 3,074,510
Patented Jan. 22, 1963

3,074,510
LUBRICATION
Thomas R. Thomas, New York, N.Y., assignor to Auto Research Corporation, Dover, Del., a corporation of Delaware
Filed May 27, 1958, Ser. No. 738,128
7 Claims. (Cl. 184—55)

The present invention relates to lubricating systems and it particularly relates to a finely divided application of coolants and lubricants to cutting and grinding operations or for the application of oil or lubricants to chain gears and other devices to be supplied with lubricant.

It is among the objects of the present invention to provide a central control unit which will serve to prepare and enable transmission of a coolant-lubricant composition which may be conveyed to or applied to various types of mechanisms and particularly chain gears at suitable locations remote from the source of the lubricant.

Another object is to provide a novel application system which will be readily adaptable to a wide variety of types of standard water base coolants and which will be readily adapted to various types of viscosities of oil and which will permit remote or adjacent application of jets of a coolant and lubricant in cutting and grinding operations, and to applications to chain gears in a wide variety of mechanical elements.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most suitable to provide a central combination air trap and filter unit which will receive compressed air from a standard source and in which there will also be incorporated a pressure regulator including an air pressure reduction and liquid pressurizing device to form the spray or dispersion of the coolant and/or the lubricant or oil for remote application. The central source will receive the compressed air supply from a shop source and the feed of such air will be controlled by valve means desirably of a solenoid type with duplicate tubing lines then conveying the air and the liquid from the control unit to the jets from which the coolant is applied to the cutting or grinding operation or to the chain gears or other mechanical element.

In one embodiment of the invention the device has a metal or cast head having recesses which receive two transparent cylinders closed at their bottom ends, one of which serves as an air cleaner and moisture separator and the other of which serves as a liquid reservoir. The head has a connection for receiving air under pressure and it has separate air and liquid outlets to feed into the two-pipe system which will lead to the jet outlets associated with the bearings to be lubricated.

Each of the jet outlets desirably has a liquid flow adjustment and is provided with a concentric or parallel piping arrangement by means of which a jet is applied to the cutting or grinding operation or to the particular machine elements which it is desired to lubricate.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:
FIGURE 1 is a top plan view of a central unit;
FIG. 2 is a front elevational view of the unit partly in section more clearly to show the interior construction;
FIG. 3 is an end elevational view taken from the right side of FIG. 2;
FIG. 4 is a fragmentary transverse vertical sectional view taken upon the line 4—4 of FIG. 1, upon the same scale as FIG. 1;
FIG. 5 is a transverse vertical sectional view upon the line 5—5 of FIG. 1;
FIG. 6 is a transverse vertical sectional view upon the line 6—6 of FIG. 1;
FIG. 7 is a diagrammatic layout of the flow diagram showing the flow of liquid and air through the apparatus of FIGS. 1–6;
FIG. 8 is a diagrammatic view of the outlet connection by means of which the coolant is directly applied to the place of grinding or cutting or to the mechanical element to be lubricated; and
FIGURE 9 is a diagrammatic layout showing the application of the control unit of the present application to several outlet fittings by means of separate liquid and air outlet tubing.

Referring to FIGS. 1, 2 and 3, there is shown a main body member A which carries the air cleaner and moisture separator B and the liquid reservoir C. The air cleaner and moisture separator and the liquid reservoir are each provided with the drain or clean-out plugs D and E. The unit as shown in FIGS. 1, 2 and 3 is provided with an air inlet F, an air outlet G, a liquid outlet H, and an electric conduit hole LL.

The plate 220 in FIG. 1 held in position by the screws 221 permits access to a terminal box arrangement which will permit splicing of the conduit wires inserted through the electric conduit hole LL.

The electric conduit hole LL is shown as being tapped to permit fastening of electric cable condiuts which are required for safe installation (see FIGS. 4 and 1).

The head A is provided with a pressure gauge J and with a pressure regulator adjustment K including a spring pressed diaphragm controlled valve, as best shown in FIG. 6.

The arrangement is also provided with a solenoid control valve L best shown in FIG. 5 which is operated by means of electrical controls. The oil filler plug or liquid filler plug M enables the liquid reservoir C to be filled. The air filter N will separate moisture or other undesirable material carried by the air which flows in through the air inlet F. The liquid also is provided with a filter means P which is at the bottom of the outlet tube Q.

In FIGURE 7 is shown a flow diagram illustrating the operation of the device of FIGS. 1–6. It will be noted by reference to FIG. 7 that the compressed air flows in at F into the chamber B where it is filtered by the air filter N.

The drain D permits removal of any collected water which has been separated in the air cleaner and moisture separator B.

The cleaned air will then flow via the conduit R past the pressure regulator device K. Then it will flow past the pressure gauge J and past the solenoid valve L. The pressure regulator K has the adjustment S, the spring T and the diaphragm U as shown in FIG. 6 with the valve member V regulating the actual flow.

The solenoid valve L will have the solenoid coil W and the armature X (see FIG. 5).

From the solenoid valve L, as shown in FIG. 7, the flow will be through the conduit system Y (see FIG. 4) into the upper part of the liquid reservoir C. The liquid in the liquid reservoir C will be forced past the filter P to the outlet H while the air will pass out through the outlet G.

The drain E permits removal of any undesired collected material.

In FIG. 8 is shown a typical remote outlet by means of which the coolant is discharged onto the cutting or grinding operation or onto the mechanical element.

Referring to FIG. 8, there is shown the typical outlet unit Z having a conduit connection at AA from the liquid connection H and an air connection BB from the air connection G of the unit shown in FIGS. 1–6. Thus, the air and liquid will then flow through the concentric double tubing unit CC to the nozzle DD which will apply the coolant directly onto the place where it is to be applied with the liquid usually being in the central passageway and the air being in the passageway surrounding it. The adjustment EE permits regulation of the liquid flow through the liquid inlet AA.

Referring specifically to FIG. 4, the air inlet F consists of a tapped opening 20 in the body A to which suitable connection from a source of compressed air may be made. The air will flow from the tap connection 20 into the dome 21 and then into the interior 22 of the vessel B. The vessel B consists of a transparent cylinder 23 which at its upper end is received in a shallow recess 24 and is sealed by means of the annular gasket 25. The lower part of the cylinder B is sealed by means of a cup 26 having the peripheral flange 27 inside of which fits the lower end 28 of the plastic or glass cylinder 23. The gasket 29 will make a pressure or tight connection. A central member 30 extends through the central axis of the cylindrical member 23 and it is axially bored at its lower end at 31 and provided with radial bores 32 which communicate with the interior of the vessel or chamber B. The lower part of the central member 30 is threaded as indicated at 33 to receive the drain body member 34. The drain body member 34 has a valve seat 35 against which is normally pressed on the seat member 36 of valve plug 38.

The lower end of the member 34 is tapped as indicated at 37 and it receives the centrally bored plug 38, having the seating face 36.

When the plug 38 is screwed downwardly it will unseat the valve 35 permitting water or any liquid which has been collected in the bottom of vessel B to drain out through the opening 39.

The cup 26 has a central recess 50 which receives the lower end of a spring 51, said spring encircling the central member 30.

The spring 51 at its upper end 52 will press upon the shallow cup 53 which holds the lower end of the cylindrical ceramic filter N so that the air must pass through the filter to leave the chamber or vessel B.

The filter N is closed at its upper end by the inverted dish 54 which is mounted on the nut 55 which engages the threaded portion 57 of the upper end of the central member 30.

The central member 30 has a radial bore 58 and the center bore 59 which forms part of the conduit system R (see FIG. 6).

The upper threaded portion 57 of the member 30 is screwed into the tapped recess 60 in the body A (see FIG. 6).

The air which has flowed from the inlet connection F into the interior of the vessel B and been filtered by the cylindrical filter N then flows into an annular space between the cylindrical filter N and the central member 30 and thence into the radial passage 58 and the central bore 59 back into the chamber 61 (see FIG. 6). From the chamber 61 it then flows through the bore 62 past the pressure regulator K.

The body A above the vessel B has a tapped opening 75 which receives the hollow nut member 76 having a threaded reduced diameter portion 77 and an interior chamber 78.

The chamber 78 receives a coil spring 79 which presses on the cylindrical member 80 forming part of the valve V. If the cylindrical member 80 presses against the valve seat 81 it will reduce the flow of air from the chamber 61 and the bore 62 through the passageway 82.

The passageway 82 is formed in the insert disc 83 which fits into the recess 84 in the head member A. Above the passageway 82 is the diaphragm chamber 85 positioned below the diaphragm U.

The diaphragm U has a central stiffening plate 86 against which presses the coil spring T held in the chamber 87.

The chamber 87 is formed in the threaded member 88 from a part of the pressure regulator K which has a threaded connection at 89 in the head A.

The threaded connection at 89 has the encircling foot 90 which clamps the edges of the diaphragm in position against the shoulder 91 at the bottom of the chamber 92.

The pressure of the spring T may be regulated by an adjustment S. The spring T has an end plate 93 which may be pressed down or released by means of the screw 94.

The screw 94 has an adjustment slot 95 and it is received inside of the capped nipple 96.

The capped nipple 96 is capped by a screw 97 (see FIG. 6). By removing the nipple 96 or removing the cap screw 97 access is had to the filister slot 95 by means of which the tension on the spring T may be varied.

The adjustment on the spring T will regulate the pressure in the diaphragm chamber 85 and this will regulate the amount of cutoff by the valve part 80 so that the air passes through the opening 82. The valve normally will be held open by the extension 98 extending downwardly through the opening 82 to contact the top of the reciprocating cylindrical valve element 80.

The diaphragm chamber 85 is in direct communication with the pressure gauge J through the bore or passageway 99.

The pressure gauge, it will be noted, is positioned in the chamber 100 and it is readily accessible by removing the cover 101 held in position by the screws 102 (see FIGS. 1 and 5).

The pressure gauge J will thus indicate the pressure in the diaphragm chamber 85 which will be regulated by the adjustment of the spring T of the diaphragm through the extension 98 acting on the reciprocating valve 80 which by coaction with the seat 81 will regulate the pressure flowing through the bores 59, 61 and 62.

From the diaphragm chamber 82 the air under pressure will flow past the solenoid valve L.

As shown, the air will flow from the diaphragm chamber 85 through the bore 120 to the peripheral chamber 121 to the lower part of the solenoid valve L. From the peripheral chamber it will pass into the radial bore 122 and then past the valve seat 123 into the chamber 124, the radial bore 125, the peripheral recess 126, the bore 127 and the bore 128 forming part of the conduit system Y. From the bore 128 it flows into the dome 129 as shown at the right of FIG. 4 above the vessel C.

The solenoid valve unit is held in position in the body A by the lower flange portion 130 and the upper cap portion 131 with nut 138 acting as a clamping means (see FIG. 5).

The lower flange portion 130 is provided with a gasket 132 and an O ring 133 to seal off the chamber 126 and the passageway 125. An upper O ring 134 is provided to seal off the passageways 120, 121, and 122.

The solenoid W acts upon the armature X to reciprocate the valve 135 which is provided with a spring 136. When the valve closes, it will shut off the source of air into the chamber C and when it opens it will permit flow of air into the chamber C The upper end of the armature X is threaded as indicated at 137 and has a cap 138 which holds the whole solenoid unit in place The armature X of the solenoid is hollow. The plunger having the valve 135 at its lower end reciprocates in the hollow armature.

There is provided an inner stop to limit the plunger travel and the spring 136 tends to keep the valve 135 down against the seat 123.

When the solenoid is electrically energized, the valve 135 is kept open.

The nut 138 clamps and holds the entire solenoid unit, as shown in FIG. 5, in place.

It will be noted that the entire solenoid valve arrangement is held within the rear portion of the upper head or body A in pressure-tight fashion by means of the gaskets or O rings 132, 133 and 134 and the cap 131 and that the air can only pass from the passageway 120 to the passageway 127 and into the dome 129 above the body of liquid, oil or coolant in the chamber C.

The drain connection E in the chamber C is of the same construction already described in connection with D.

The central member Q which has a bore 150 receives liquid through the radial passageway 151 after it has been filtered through the filter P.

The filter P is held in position by means of the cap 152 and the spring 153 pressing down thereon.

The cylinder C is held in position in the shallow recess 154 in liquid-tight fashion by the gaskeet 155 and by reason of the drain body member E which is threaded on the lower threaded end of the central axial member Q.

The central tubular member Q is screwed at 164 into the top 165 of the dome 129 and it communicates with the bore 156 at the threaded liquid outlet H.

The air under pressure may pass directly from the dome 129 through the threaded outlet G (see FIG. 4).

Liquid, whether oil, lubricant or coolant may be readily supplied to the chamber C by means of the screw cap M which has a lower threaded portion 157 and is safeguarded against loss by means of a ring 158 and the chain 159.

The filler cap M has a gasket connection 160 which will seal the dome 129 and prevent air under pressure from escaping. Liquid should only be placed in the chamber C when the air pressure is off.

In operation, the chamber C will carry liquid up to the filling line 161, leaving sufficient space for the air body in the dome 129.

The air under pressure will flow in through the opening of air inlet F into the chamber B and will be filtered by the filter N.

It will then flow from the filter N through the passageways 59, 61 and 62 (see FIGS. 4 and 6) past the valve 80 and into the diaphragm chamber 85.

The pressure in the diaphragm chamber 85 as regulated by the adjustment of the spring T will be readily determined by the gauge J.

From the chamber 85 of FIG. 6 the air under pressure will then flow past the solenoid valve through the passageways 120, 121, 122 past the valve seat 123 and the passageways 124, 125, 126 and 127 and 128 into the compressed air dome 129 (see FIG. 4).

The compressed air in the air dome 129 will exert sufficient pressure upon the liquid in the chamber C to force it up through the bore 150 and out through the connection H at the same time the air under pressure may flow out through the connection G.

By separate tubing connections, as shown in FIGS. 8 and 9, the air and liquid will be supplied to the nozzle or spray fittings Z, FF and GG by means of the junctions HH and JJ.

The liquid lines are indicated by solid lines in FIG. 9 while the air lines are indicated by double lines in FIG. 9.

The apparatus as shown is particularly designed for the application of coolants, to cutting and grinding operations or for the application of oil to chains, gears and other points to be lubricated. The adjusting elements EE will enable accurate needle valve adjustment of liquid flow at the point of application.

The central control unit, as shown in FIGS. 1–6, has a combination air trap B, air pressure reduction system consisting of the pressure regulator K and the solenoid valve L associated with the pressure gauge J.

The air is filtered in the vessel B by the filter N and the liquid lubricant or coolant is filtered in the vessel C by the filter P.

The jets Z, FF and GG are mixing valves in which the air and the liquid are combined to form the desired spray or mist.

Only the liquid flow is controlled by the regulators or adjustments EE while the air flow is constant once the desired pressure has been set by the pressure regulator K at the central unit of FIGS. 1–6.

The system shown may be used with all types of standard water base coolants and with all types and viscosities of oil.

From one to ten jets may be used with each control unit and the only limitation on additional jets will depend on the amount of compressed air available.

The preferred air spray is a typical shop compressed air supply of 80 to 120 lbs. per square inch.

The leads to the solenoid W should be associated with an element of machine control that is constantly energized during operation.

Although two tubing lines are shown conveying the air and liquid from the central control unit of FIGS. 1 to 6 to the jets Z, FF and GG, a concentric line of suitable design may also be employed.

While there has been herein described a preferred form of the invention, it should be understood that the same may be altered in details and in relative arrangement of parts within the scope of the appended claims.

Having now particularly described and ascertained the nature of the invention, and in what manner the same is to be performed.

What is claimed is:

1. In a jet coolant distribution system for a machine tool of the type having a parallel conduit system, one for air under pressure and one for coolant liquid, and a jet unit at the end of the conduit system for mixing the air and coolant and directing it as a jet to a point of application; a central unit for separately supplying air pressure and coolant to the conduit system comprising a rectangular head block with a top, bottom and ends and provided with an air pressure inlet at one end, parallel and separate air pressure and coolant outlets at the other end to the conduit system and a large domed circular recess at the bottom of the block provided with mounting means, a depending coolant receptacle mounted at its upper end in said recess and a tubular outlet coolant conduit from the receptacle extending vertically through said receptacle, said conduit being attached at its upper end to the head in the center of the domed recess and at its lower end having an inlet from the coolant receptacle, said block having a passageway connecting the upper end of the tubular outlet to the separate coolant outlet, a filter positioned at and protecting said conduit inlet, a moisture removing receptacle, said head having air pressure passageways for conducting the air pressure from the air pressure inlet to and from the moisture removing receptacle to the domed recess, said air pressure passageways leading to and having an inlet to one side of the domed recess at the top of the coolant receptacle, said air pressure outlet opening into said domed recess at its opposite side so that the air pressure will pass into and transversely across the domed recess and the top of the coolant receptacle, said head also having a passageway from the upper end of the outlet coolant conduit to the coolant outlet.

2. The unit of claim 1, said head having a coolant inlet passageway with a removable inlet cap extending from the top of the head into the domed recess above the coolant reservoir and a solenoid controlled cut off valve, a pressure gauge and a diaphragm pressure regulating valve connected to the air pressure passageways in the head between the moisture removing receptacle and the coolant receptacle.

3. The unit of claim 1, the moisture removing receptacle depending from the head and located in the air pressure passageway before the coolant receptacle, said receptacles both consisting of depending transparent cylindrical containers.

4. A central source of air under pressure and coolant liquid for supplying a two conduit system having a plurality of outlets at a distance from the source where the air and coolant are combined and the coolant is projected in finely divided form by the air upon a metal cutting operation requiring application of coolant, comprising a rectangular block head having separate inlets and separate outlets for the air under pressure and the coolant, a coolant reservoir, passageways in the head leading from the separate inlets and leading to the separate outlets from the head, a dome recess in the reservoir to which the air is admitted under pressure, said air under pressure in said recess serving to propel the coolant through said system and to said system outlets, said reservoir comprising an open top depending container mounted in said head directly under and opening into said dome recess and a central depending vertical outlet tube extending downwardly through said reservoir and receiving coolant from the bottom of said reservoir and supplying coolant to the separate outlet for the coolant in the head, moisture removing means for the air under pressure connected by said passageways in the head to receive air under pressure from the inlet and to supply air under pressure to the dome recess and the coolant reservoir, and a solenoid controlled cut off valve and a spring biased diaphragm pressure regulating valve positioned in the passageway between the moisture removing means and the coolant reservoir and the air under pressure flowing directly transversely through the dome recess and the upper part of the coolant reservoir before passing into the air outlet from the head.

5. The source of claim 4, said moisture removing means and said reservoir comprising parallel depending cylinders mounted at their upper ends in peripheral sealing shoulders in the bottom of the head, and said moisture removing means also having a central vertical axial outlet conduit extending axially downwardly therethrough the full height of the cylinder, caps closing off and supporting the bottom ends of the cylinders and said caps being carried by the lower ends of said outlet tube and conduit, said outlet conduit in the moisture removing means also serving to supply air from the removing means to the coolant reservoir.

6. A coolant-air pressure source for a coolant distribution system comprising a head member, a plurality of depending transparent cylinder members closed at their upper end by said head, respectively, for receiving air under pressure and coolant liquid, lower cap members closing the lower ends of said cylinder members, central drain members centrally positioned on said cap members, and a pressure regulator and solenoid valve control means located in said head, said head having an inlet from a source of air under pressure to the cylinder member receiving air, and an air pressure passageway in the head for the air from said air cylinder member to said coolant cylinder member, said pressure regulator and solenoid valve control means being positioned in said passageway, and an outlet for the air pressure from the coolant cylinder member.

7. A central pressure and control unit for supplying air on one hand and liquid coolant on the other hand separately through a parallel tubing system to a plurality of outlet jet units comprising an air receptacle, a coolant receptacle having separate air and coolant outlets, a conduit system supplying air under pressure to said air receptacle and then from said air receptacle to said coolant receptacle and also supplying the air and coolant under pressure from said coolant receptacle to the separate outlets from said coolant receptacle and to the parallel tubing system to said outlet units, a pressure regulating unit in said conduit system and a solenoid control valve in said conduit system to open and cut off the flow from the air receptacle to the liquid receptacle, the upper part of said coolant receptacle serving as an intermediate air receptacle to receive and discharge the air under pressure, the separate outlets receiving air and liquid under the pressure from the coolant receptacle leading from the outlets from the liquid receptacle to the outlet units, said unit having an upper head and said receptacles being mounted on and depending from said head and said conduit system including passageways in the head extending to and between the receptacles.

References Cited in the file of this patent
UNITED STATES PATENTS

| | | |
|---|---|---|
| 1,184,248 | Lindekugel | May 23, 1916 |
| 1,860,136 | Bunch | May 24, 1932 |
| 1,990,524 | Bystricky | Feb. 12, 1935 |
| 2,394,424 | Bourke | Feb. 5, 1946 |
| 2,551,078 | Wing | May 1, 1951 |
| 2,667,236 | Graves | Jan. 26, 1954 |
| 2,730,269 | Earle et al. | Jan. 10, 1956 |
| 2,835,267 | Andresen et al. | May 20, 1958 |
| 2,865,469 | Lyden | Dec. 23, 1958 |
| 2,868,584 | Faust | Jan. 13, 1959 |